United States Patent
Klaiber et al.

(10) Patent No.: US 8,203,097 B2
(45) Date of Patent: Jun. 19, 2012

(54) WORKPIECE SUPPORT CLEANING

(75) Inventors: Wolf Klaiber, Ditzingen (DE); Harry Thonig, Neukirch (DE); Klaus Vogel, Kirschau (DE); Eberhard Wahl, Weilheim (DE); Utz Schorn, Stuttgart (DE); Martin Petera, Sindelfingen (DE); Karel Vincke, Oedelem (BE); Norbert Gruhl, Hochkirch (DE)

(73) Assignees: TRUMPF Sachsen GmbH, Neukirch (DE); TRUMPF Werkzeugmashinen GmbH + Co. KG, Ditzingen (DE)

( * ) Notice: Subject to any disclaimer, the term of this patent is extended or adjusted under 35 U.S.C. 154(b) by 470 days.

(21) Appl. No.: 12/356,776

(22) Filed: Jan. 21, 2009

(65) Prior Publication Data

US 2009/0184097 A1 Jul. 23, 2009

(30) Foreign Application Priority Data

Jan. 22, 2008 (EP) .................................... 08001097

(51) Int. Cl.
B23K 26/02 (2006.01)
B21B 45/02 (2006.01)
(52) U.S. Cl. .............. 219/121.82; 219/121.67; 15/256.5; 15/256.51
(58) Field of Classification Search ............. 219/121.67, 219/121.68, 121.78, 121.82; 15/256.5, 256.51
See application file for complete search history.

(56) References Cited

U.S. PATENT DOCUMENTS

| 4,155,602 A * | 5/1979 | Quick ........................... 406/104 |
| 5,304,773 A * | 4/1994 | Kilian et al. ............. 219/121.78 |
| 5,317,943 A * | 6/1994 | Dowdle ............................. 83/56 |
| 5,698,120 A * | 12/1997 | Kurosawa et al. ....... 219/121.62 |
| 5,885,363 A | 3/1999 | Nakamura |
| 6,437,286 B1 | 8/2002 | Scott |
| 7,759,608 B2 * | 7/2010 | LeMasson ............... 219/121.82 |
| 2006/0075593 A1* | 4/2006 | Graf et al. ..................... 15/256.5 |
| 2007/0051710 A1 | 3/2007 | Odanaka et al. |

FOREIGN PATENT DOCUMENTS

| CN | 1136487 A | 11/1996 |
| DE | 4436551 | 12/1995 |
| DE | 202004015922 | 3/2006 |
| FR | 2865154 | 7/2005 |

OTHER PUBLICATIONS

International Search Report from corresponding European Application No. 08 001 097.8, mailed Jul. 1, 2008, with English translation, 15 pages.

* cited by examiner

*Primary Examiner* — Timothy J Dole
(74) *Attorney, Agent, or Firm* — Fish & Richardson P.C.

(57) ABSTRACT

A mechanical apparatus maintains and/or cleans support strips of a workpiece support that forms a support plane for supporting workpieces. The mechanical apparatus includes a transport device for moving the workpiece support along a transport axis X and a service device that has a tool for processing the support strips. The service device is movable by means of a mechanical movement unit along a movement axis Y that is arranged at an angle relative to the transport axis X and/or along a movement axis Z that is arranged at an angle relative to the transport axis X and that is different from the movement axis Y, with the movement of the workpiece support along the transport axis X and the movement of the service device along the movement axis Y and/or along the movement axis Z being controllable in a coordinated manner by means of a control unit.

24 Claims, 2 Drawing Sheets

WORKPIECE SUPPORT CLEANING

CROSS REFERENCE TO RELATED APPLICATION

This application claims priority under 35 U.S.C. §119(a) to European Application No. 08 001 097.8, filed on Jan. 22, 2008, the entire contents of which are hereby incorporated by reference.

TECHNICAL FIELD

The invention relates to a mechanical apparatus and method for maintaining and/or cleaning support strips of a workpiece support that forms a support plane for supporting workpieces.

BACKGROUND

Workpiece supports are used to support workpieces, for example, in a laser cutting machine. The workpiece supports that are loaded with the workpieces are conveyed by means of a transport device toward and away from the processing machine. The workpiece supports form a support plane for supporting the workpieces by means of a plurality of support strips that are spaced from each other and on which the workpieces are located in a discontinuous manner. As a result of the workpiece processing, in particular, the thermal processing of the workpieces, contamination, which impairs the operation of the workpiece support, can become deposited on the support strips. It is also conceivable that a plurality of layers of small workpiece parts, in particular, small sheet metal parts, become baked onto the support strips. The support strips can further become deformed in an undesirable manner owing to thermal and mechanical stresses during operation. Therefore, the workpiece supports are checked, maintained, and cleaned at given time intervals.

SUMMARY

In one general aspect, a workpiece support strip servicing apparatus is used for servicing support strips of a workpiece support that forms a support plane for supporting workpieces. The apparatus includes a support transporter coupled to and configured to move the workpiece support along a transport axis X; a service tool transporter that has a tool configured to process the support strips; a tool movement unit coupled to and configured to move the service tool transporter along one or more of a movement axis Y arranged at an angle relative to the transport axis X and a movement axis Z arranged at an angle relative to the transport axis X and different from the movement axis Y; and a movement controller coupled to both the support transporter and to the tool movement unit and configured to control both the support transporter and the tool movement unit so as to coordinate the relative movement of the support strips of the workpiece support along the transport axis X with respect to the movement of the tool of the service tool transporter along one or more of the movement axis Y and the movement axis Z.

Implementations can include one or more of the following features. For example, the transport axis X and the movement axis Y can be parallel with the support plane of the workpiece support and the movement axis Z can be perpendicular to the support plane of the workpiece support.

The support strips can extend along a direction that is parallel with the transport axis X. The support strips can extend along a direction that is parallel with the movement axis Y.

The movement controller can be configured to control the support transporter and the tool movement unit in such a manner that the workpiece support constantly moves along the transport axis X and the service tool transporter is positioned along the movement axis Y in a stepwise manner with a step dimension (d) that corresponds to a multiple of a distance between centers of adjacent support strips, where the multiple is an integer number that is greater than or equal to one.

The movement controller can be configured to control the support transporter and the tool movement unit in such a manner that the service tool transporter constantly moves along the movement axis Y and the workpiece support is positioned along the transport axis X in a stepwise manner with a step dimension (d) that corresponds to a multiple of a distance between centers of adjacent support strips, where the multiple is an integer number that is greater than or equal to one.

The apparatus can include a tool drive configured to produce a tool movement of the tool. The tool movement can be directed in a longitudinal direction of the support strips. The speed of the tool can differ from the speed of the workpiece support and from the speed of the service tool transporter.

The service tool transporter can include a plurality of identically constructed tools that are associated with a support strip or with different support strips. The service tool transporter can include a plurality of differently constructed tools that are associated with a support strip or with different support strips.

The tool can include a cleaning roller that has an outer face that abuts against a longitudinal side of the associated support strip and rotates about an axis of rotation that is directed parallel with the movement axis Z. Two identical cleaning rollers can form a cleaning roller pair whose cleaning rollers are arranged at the mutually opposing longitudinal sides of a support strip and are driven with opposing directions of rotation. The tool can include one or more of two cleaning rollers in the form of preliminary cleaning rollers that form a preliminary cleaning roller pair for the preliminary cleaning of a support strip and two cleaning rollers in the form of final cleaning rollers that form a final cleaning roller pair for the final cleaning of the support strip. The tool can include three cleaning roller pairs that form a cleaning roller set, with two preliminary cleaning roller pairs being adjacent to both sides of a final cleaning roller pair that is arranged between them.

The service tool transporter can include an optical sensor having an evaluation unit, wherein the sensor is configured to detect and signal an actual state of a support strip contour, and the evaluation unit is configured to generate a control signal for the movement controller in accordance with a desired state of the support strip contour.

In another general aspect, a processing machine includes a workpiece support strip servicing apparatus for servicing support strips of a workpiece support that forms a support plane for supporting workpieces. The servicing apparatus includes a support transporter coupled to and configured to move the workpiece support along a transport axis X; a service tool transporter that has a tool configured to process the support strips; a tool movement unit coupled to and configured to move the service tool transporter along one or more of a movement axis Y arranged at an angle relative to the transport axis X and a movement axis Z arranged at an angle relative to the transport axis X and different from the movement axis Y; and a movement controller coupled to both the support transporter and to the tool movement unit and configured to control both the support transporter and the tool movement unit so as to coordinate the relative movement of the support strips of the workpiece support along the transport axis X with respect to the movement of the tool of the service tool transporter along one or more of the movement axis Y and the movement axis Z.

In another general aspect, support strips of a workpiece support that forms a support plane for supporting workpieces are processed by moving a workpiece support along a transport axis X; moving a service tool transporter that includes a tool for processing the support strips along one or more of a movement axis Y that is arranged at an angle relative to the transport axis X and a movement axis Z that is arranged at an angle relative to the transport axis X and that is different from the movement axis Y; and coordinating the relative movement of the support strips of the workpiece support along the transport axis X with respect to the movement of the tool of the service tool transporter along one or more of the movement axis Y and the movement axis Z.

Implementations can include one or more of the following features. For example, coordinating the relative movement can include constantly moving the workpiece support along the transport axis X and positioning the service tool transporter along the movement axis Y in a stepwise manner with a step dimension (d) that corresponds to a multiple of a distance between centers of adjacent support strips, wherein the multiple is an integer number that is greater than or equal to one.

Coordinating the relative movement can include constantly moving the service tool transporter along the movement axis Y and positioning the workpiece support along the transport axis X in a stepwise manner with a step dimension (d) that corresponds to a multiple of a distance between centers of adjacent support strips, wherein the multiple is an integer number that is greater than or equal to one.

The tool can be moved along a longitudinal direction of the support strips.

The movement of the tool can include abutting an outer face of a cleaning roller of the tool against a longitudinal side of the associated support strip and rotating the cleaning roller about an axis of rotation that is directed parallel with the movement axis Z.

The an actual state of a contour of a support strip can be optically detected and signaled, and a control signal can be generated for the coordinated movement in accordance with a desired state of the support strip contour.

The workpiece support strip servicing apparatus and associated method improve the automation of the servicing (for example, the maintenance and/or cleaning) of support strips with little technical complexity.

In the servicing apparatus, the service tool transporter is moved by means of a tool movement unit in a movement axis Y that is arranged at an angle relative to the transport axis X and/or in a movement axis Z that is arranged at an angle relative to the transport axis X and that is different from the movement axis Y, and in the case of which there is provided a movement controller that controls the support transporter that is provided for moving the workpiece support and the tool movement unit provided for moving the service tool transporter, and that thereby coordinates the movement of the workpiece support along the transport axis X, on the one hand, and the movement of the service tool transporter along the movement axis Y and/or along the movement axis Z, on the other hand, with each other.

The spatial association of the tool with the support strip that is intended to be processed is brought about by combining and coordinating at least two movement components, one of which is provided by the support transporter of the processing machine. Accordingly, the support transporter that is provided for positioning the workpiece support on the processing machine is also used, with dual functionality, for providing a service movement along the transport axis X. In addition, a movement component for moving the service tool transporter along a movement axis Y and/or a movement component for moving the service tool transporter along another movement axis Z is provided by a tool movement unit that holds and guides the service tool transporter. The tool movement unit can, for example, be formed by a gantry having movement components that are movable along linear guides.

The service tool transporter can also be guided by a tool movement unit that is formed by a pivotable carrier having rotationally movable movement components or that has a combination of the movement components mentioned. All the movement components, including the movement component of the support transporter, are coordinated with each other by means of the movement controller in such a manner that automated association of the tool of the service tool transporter with respect to the support strip is ensured. Use can be made of both tools that bring about mechanical processing of the support strip, such as, for example, brush, abrasion, sand-blasting, scraping or impact type tools, and tools for thermally processing support strips, such as, for example, laser beam tools. The service tool transporter can be provided with a tool or with a plurality of uniform or different tools. In accordance with the construction of the service tool transporter used, there is provided by the tool movement unit movement of the service tool transporter that is coordinated with the tool(s). For instance, the tool(s) of the service tool transporter can be positioned with respect to the support strips by means of the tool movement unit in only one movement axis Y or Z, such as, for example, in a service unit that is in the form of a scraping or impact type device. The comprehensive processing of the support strips is brought about by the supplementary movement of the workpiece support along the transport axis X.

The workpiece support strip servicing apparatus is a structurally simple, space-saving and efficient solution.

The tool movement unit can be arranged at any location along the transport axis X of the support transporter and consequently particularly outside the operating region of the processing machine. The maintenance and cleaning operation on a workpiece support can therefore be carried out in a parallel manner and independently of the workpiece processing in the operating region of the processing machine. The tool movement unit is preferably arranged with the service tool transporter on a service station, which is provided along the transport axis X of the support transporter. The service station for cleaning and maintaining the workpiece supports is arranged downstream, for example, of an unloading station, at which the processed workpiece is unloaded from the workpiece support, in the transport direction of the workpiece support, or is arranged upstream of a loading station, at which the workpiece support is loaded with a workpiece which is intended to be processed.

The transport axis X and the movement axis Y can be directed parallel with the support plane and the movement axis Z can be directed perpendicularly relative to the support plane.

As a result, an association of the movement axes of the service tool transporter relative to the support plane of the workpiece support is defined and keeps the complexity for coordinating the movements that are intended to be coordinated, and further also the structural complexity necessary for the tool movement unit, at a low or reduced level. At least the transport axis X and the movement axis Z extend at right-angles relative to each other. If the movement axis Y is further orientated at right-angles relative to the transport axis X, the axes in question extend in the three Cartesian coordinate directions of space, which further reduces the coordination and construction complexity. The support plane preferably extends horizontally, as do the transport axis X and the movement axis Y. The movement axis Z is then orientated vertically.

If the support strips are arranged parallel with the transport axis X, this allows the support strips to be processed, where the tool of the service tool transporter is associated with the support strips in a stationary manner, while the workpiece support is moved along the transport axis X.

If the support strips are arranged parallel with the movement axis Y, and consequently at an angle, preferably perpendicularly, relative to the transport axis X, this allows the support strips to be processed, where the workpiece support is fixed in a stationary manner during the processing of the support strips and the tool is moved along the stationary support strips. Depending on the application, either of these configuration is selected.

The movement controller can constantly move the workpiece support along the transport axis X and move the service tool transporter along the movement axis Y in a stepwise manner with a step dimension that corresponds to a multiple (for example, 1, 2, 3, etc.) of a distance between centers of the support strips. Consequently, an automated processing operation is brought about for maintaining or cleaning a complete workpiece support, which includes a plurality of support strips that are arranged parallel with the transport axis X. The movement controller controls a drive of the workpiece support provided on the support transporter in such a manner that a constant relative movement of the support strips in the longitudinal direction thereof is produced relative to the tool of the stationary service tool transporter, with a forward and backward movement of the support strips also being included. In addition, the control movement controller controls a Y drive of the tool movement unit for the positioning movement of the service tool transporter along the movement axis Y in such a manner that the tool is successively associated with the support strips or groups of support strips by cyclical movement of the service tool transporter. As a result, the processing of the entire workpiece support can be completely automated with little structural complexity.

The movement controller can constantly move the service tool transporter along the movement axis Y and move the workpiece support along the transport axis X in a stepwise manner with a step dimension that corresponds to a multiple (for example, 1, 2, 3, etc.) of a distance between centers of the support strips. Similarly to the above-described configuration, an automated processing operation is brought about in this instance for maintaining or cleaning a complete workpiece support, which includes a plurality of support strips that are arranged parallel with the movement axis Y. The movement controller controls the Y drive of the tool movement unit for moving the service tool transporter along the movement axis Y in such a manner that a constant relative movement of the tool directed in the longitudinal direction of the support strips is carried out relative to the stationary support strips, with a forward and backward movement of the tool along the support strips also being included. Combined with cyclical positioning of the workpiece support along the transport axis X, the support strips are successively associated with the tool so that the processing of the entire workpiece support can also be comprehensively automated in this manner with simple structural means.

A tool drive can be provided for driving the tool and produces an autonomous tool movement of the tool for processing the support strip, which movement is independent of the service tool transporter. Particularly when tools are used to mechanically process the support strips, the processing of the support strips is thereby intensified. In addition to the mechanical work of the tool carried out on the support strip, owing to the combination of the movement of the service tool transporter and the positioning movement of the workpiece support, the independently driven tool processes the support strips. The direction of the drive of the tool drive and therefore the independent tool movement is reversible.

If the independent tool movement produced by the tool drive is directed in the longitudinal direction of the support strip, the movements for processing the support strip with the tool are superimposed in such a manner that various advantageous processing effects are produced. If, for example, the movement of the mechanically operating tool is directed counter to the movement of the support strips, the resultant operating speed of the tool relative to the support strip is increased so that the mechanical operating performance is thereby increased. If, however, the movement of the tool corresponds to the direction of movement of the support strip, this brings about a resultant operating speed of the tool relative to the support strip that is reduced but can be compensated for by the tool speed being increased.

If the tool speed differs from the speed of the workpiece support and from the speed of the service tool transporter, simple means produce a value for the resultant operating speed of the tool relative to the support strips, which value is different from zero. If the tool speed is established in this manner, this ensures, for example, when an abrasive tool is used, that the tool operates in an abrasive manner. As a result, additional control and adjustment requirements for the tool speed are unnecessary.

The apparatus operates particularly efficiently if there are provided a plurality of identical tools that are associated with a support strip or different support strips. As a result, it is possible to process simultaneously, for example, one support strip at both longitudinal sides or different support strips along one of the longitudinal sides thereof.

The efficiency of the apparatus can be increased in that there are provided a plurality of differently constructed tools that are associated with a support strip or different support strips. In the movement direction of the service tool transporter along the support strip, for example, a leading first tool can be arranged and constructed for the rough cleaning or orientation of the support strips, while a second tool that follows the first tool is specially constructed for fine cleaning or final processing. In this construction, a plurality of support strips can also be processed simultaneously by the tools being associated with different support strips.

The apparatus is distinguished by a particularly advantageous and compact construction of the service tool transporter.

The workpiece support strip servicing apparatus is particularly advantageous for automating the cleaning operation. The service tool transporter can have an optical sensor having an evaluation unit, an actual state of a support strip contour being detected and signaled with the sensor, and the evaluation unit generating a control signal for the movement controller in accordance with a desired state of the support strip contour. As a result, the support strips of a workpiece support can be scanned before, during or after a processing operation and can be automatically checked for the presence of deposits. The subsequent processing operation can be configured on the basis of the result of the inspection. For example, it is possible for a cleaning operation not to be started until a particular degree of contamination of the support strips is reached. It is also possible to include an alignment operation upstream of the strip cleaning operation if the support strips are substantially deformed. The quality of the current processing operation can further be inspected. In accordance with the inspection result, the duration and intensity of the processing operation can be controlled.

The details of one or more embodiments of the invention are set forth in the accompanying drawings and the description below. Other features and advantages of the invention will be apparent from the description and drawings, and from the claims.

DETAILED DESCRIPTION

Figure 1:
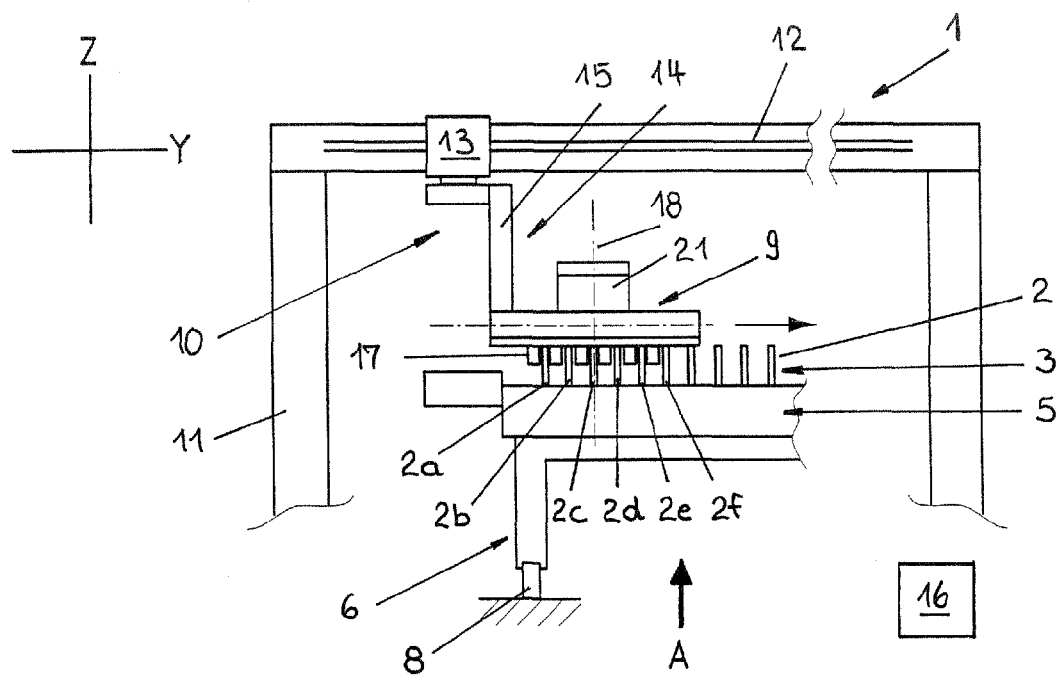
FIG. 1 is a side view of a workpiece support strip servicing apparatus in a first configuration having a service tool transporter and a tool movement unit in conjunction with a workpiece support having support strips that are arranged parallel with a transport axis X.
Figure 2:
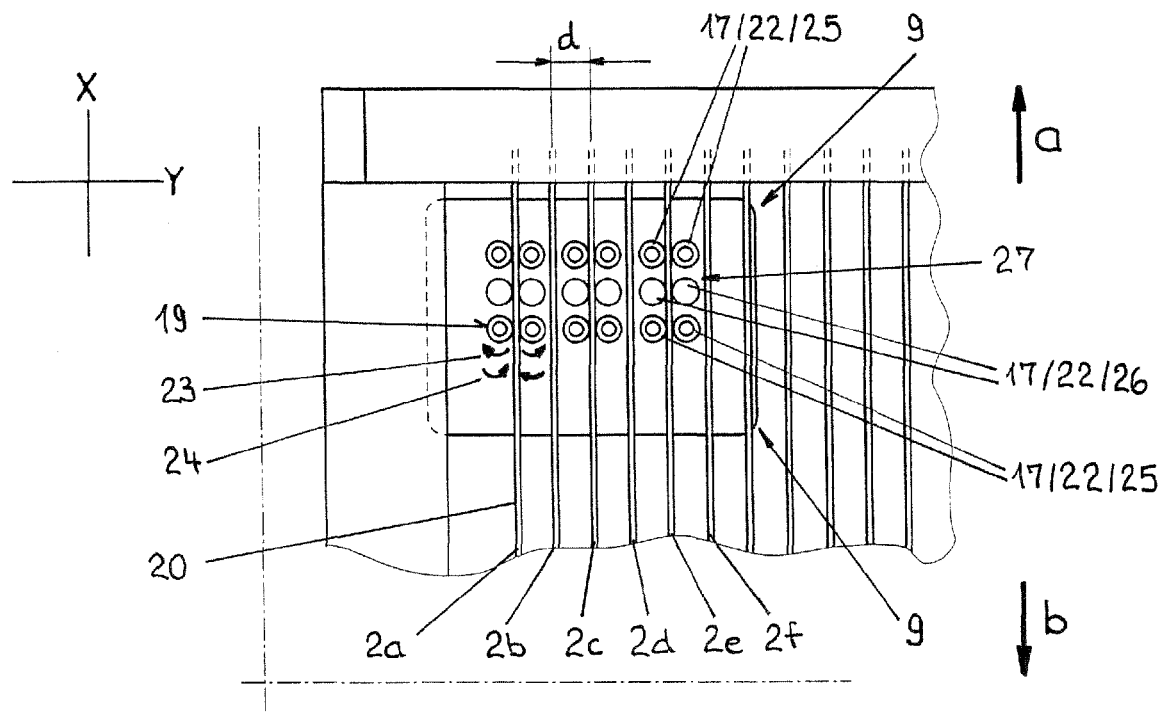
FIG. 2 is a view taken along line of sight A of the service tool transporter and the workpiece support of FIG. 1.

FIGS. 1 and 2 illustrate a mechanical apparatus (a workpiece support strip servicing apparatus) 1 for servicing (for example, cleaning) support strips 2 of a workpiece support 3. The workpiece support 3, which is formed by a plurality of mutually parallel and mutually spaced-apart support strips 2, serves to support metal workpieces that are thermally cut in a sheet metal processing machine, in this instance, in a laser cutting machine 4 (only indicated in FIG. 3).

Figure 3:
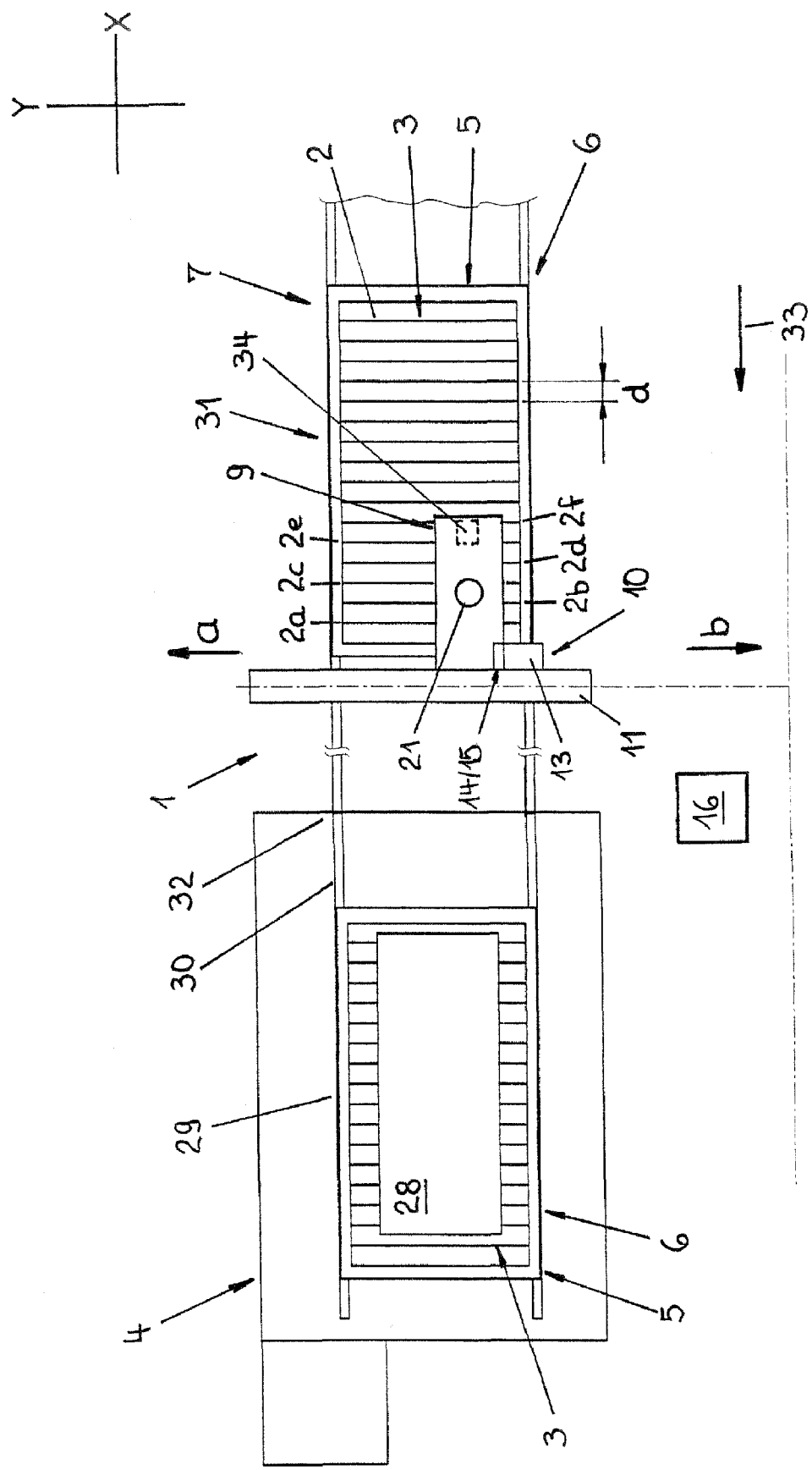
FIG. 3 is a top view of a workpiece support strip servicing apparatus in a second configuration having a service tool transporter and a tool movement unit in conjunction with a workpiece support having support strips that are arranged at an angle of 90° relative to the transport axis X.

The workpiece support 3, integrated in a transport pallet 5, is conveyed by means of a transport device (a support transporter), in this instance, indicated as a rail-guided transport carriage 6, along a horizontally orientated transport axis X in order to position the metal sheets in an operating region 29 of the laser cutting machine 4, and optionally at other stations, for example, a loading and unloading station 7 (FIG. 3). A rail guide 8 for the transport carriage 6 extends parallel with the transport axis X, which extends in FIG. 1 perpendicularly relative to the plane of the drawing. The support strips 2 of the workpiece support 3 extend along a longitudinal direction and are arranged to extend parallel with the transport axis X.

The mechanical apparatus 1 of FIGS. 1 and 2 also includes a service device 9 (a service tool transporter) that is retained and guided by a tool movement unit 10. The service device 9 is moved by means of the movement unit 10 along a horizontally orientated movement axis Y and along a vertically orientated movement axis Z and is thereby positioned relative to the transport pallet 5 and the workpiece support 3.

The movement unit 10 includes a gantry 11 having a horizontal Y guide 12, which is arranged parallel with the movement axis Y, and also includes a guiding head 13, which is arranged to be movable on the Y guide 12, and an extension arm 14. The extension arm 14 has a vertical Z guide 15, which is arranged parallel with the movement axis Z. The service device 9 is secured to the extension arm 14.

The movement unit 10 also includes a Y drive, which is not illustrated in greater detail, for moving the service device 9 parallel with the Y guide 12, and a Z drive (also not illustrated) for moving the service device 9 parallel with the Z guide 15.

The Y drive allows displacement of the guiding head 13 along the Y guide 12 of the gantry 11 and consequently positioning movement of the service device 9 along the horizontal movement axis Y. The Z drive allows raising and lowering movement of the extension arm 14 and therefore positioning movement of the service device 9 along the vertical movement axis Z. The rail guide 8 of the transport carriage 5 and the Y guide 12 and the Z guide 15 of the movement unit 10 are arranged in such a manner that the transport axis X of the workpiece support 3 and the movement axes Y and Z of the service device 9 extend at right angles relative to each other.

A control unit 16 (a movement controller) controls a drive (not illustrated) of the transport carriage 6 and the Y drive and the Z drive of the movement unit 10. In this way, the movement of the transport pallet 5 with the workpiece support 3 and the support strips 2 along the transport axis X and the movements of the service device 9 along the movement axes Y and Z are coordinated with each other. For example, in order to carry out a cleaning operation, the transport pallet 5 with the workpiece support 3 is moved constantly forwards and backwards along the transport axis X, while the service device 9 is first held in position and is then positioned or moved in a stepwise manner along the movement axis Y in the manner that will be described in greater detail below.

The service device 9 has a plurality of cleaning tools or rollers 17, which are being used simultaneously in FIG. 1 at a plurality of support strips 2a, 2c, 2e for the automatic cleaning of the support strips 2. Each of the cleaning rollers 17 is supported so as to be rotatable about an axis of rotation 18 that extends parallel with the vertically orientated movement axis Z of the service device 9. The cleaning rollers 17 can therefore be applied with the outer face 19 thereof against a longitudinal side 20 of the perpendicularly arranged support strips 2a, 2c, 2e. The outer face 19 of each of the cleaning rollers 17 has grooves and, when the cleaning rollers 17, which abut the associated support strips 2a, 2c, 2e, are rotated, brings about cleaning of the rollers 17 by scraping, crushing, or abrading the contamination, for example, residual slag, which adheres to the support strips 2a, 2c, 2e. The rotational movement of the cleaning rollers 17 at a specific peripheral speed is produced by a roller drive 21 whose direction of rotation can be controlled. The roller drive 21 forms a tool drive and transmits the drive energy to all the cleaning rollers 17 by means of toothed gear wheels.

FIG. 2, which is a bottom view A of part of the service device 9 and the workpiece support 3 with the support strips 2, shows all the cleaning rollers 17 in their entirety. In each case, two cleaning rollers 17, which are arranged opposite each other at the two longitudinal sides 20 of a support strip 2, form a cleaning roller pair 22, with the cleaning rollers 17 of a cleaning roller pair 22 each being driven counter to the other.

The cleaning rollers 17 are constructed differently. The cleaning rollers 17 that are used for rough preliminary cleaning of the support strips 2 have a coarse structure of the outer face 19 and form preliminary cleaning rollers or preliminary cleaning roller pairs 25. The cleaning rollers 17 for final or fine cleaning of the support strips 2, referred to as final or fine cleaning rollers or final or fine cleaning roller pairs 26, have a structure of the outer face 19 that is finer than the structure of the preliminary cleaning rollers. In order to obtain a favorable cleaning effect, the fine cleaning rollers rotate at a different, preferably higher, speed than the preliminary cleaning rollers. The cleaning rollers 17 of the preliminary cleaning roller pairs 25 are driven in a direction of rotation that is counter to the direction of rotation of the cleaning rollers 17 of the fine cleaning roller pairs 26.

In total, the service device 9 has nine cleaning roller pairs 22 having a total of eighteen cleaning rollers 17 that simultaneously process three support strips 2a, 2c, 2e. Three cleaning roller pairs 22 that are each arranged in the longitudinal direction of one and the same support strip 2a, 2c, 2e, respectively, produce one of three cleaning roller sets 27. Each cleaning roller set 27 includes a first and a second preliminary cleaning roller pair 25. The preliminary cleaning roller pairs 25 are located at the edge of the respective cleaning roller set 27 and are arranged on both sides of a centrally arranged fine cleaning roller pair 26.

When the service device 9 and the workpiece support 3 cooperate during the cleaning operation, a positioning movement of the transport pallet 5 along the transport axis X (for example, with a movement in a forward direction a) brings about a linear movement of the support strips 2a, 2c, 2e relative to the cleaning rollers 17 of the service device 9, which is fixed in position. During the positioning movement of the support strips 2 in the forward direction a, a first preliminary cleaning roller pair 25 of each cleaning roller set 27 forms the leading cleaning roller pair 22, which the fine cleaning roller pair 26 of the relevant cleaning roller set 27 follows. The cleaning rollers 17 of the leading preliminary cleaning roller pair 22 have a direction of rotation that produces an operating movement for the cleaning rollers 17 used for preliminary cleaning, which operating movement is directed counter to the positioning movement of the support strips 2a, 2c, 2e. As a result, an intensive rough cleaning of the support strips 2a, 2c, 2e can be carried out by the leading preliminary cleaning roller pair 25. Coarse residues of slag and materials are effectively detached by the operating movement, which is directed away from the support strips 2a, 2c, 2e, in the direction of rotation of the cleaning rollers 17 of the leading preliminary cleaning roller pair 25, and are promptly conveyed out of the operating region of the cleaning rollers 17. The operating movement that is directed counter to the positioning movement of the support strips 2a, 2c, 2e further brings about an increase in the resultant operating speed of the cleaning rollers 17 of the leading preliminary cleaning roller pair 25 relative to the support strips 2a, 2c, 2e, which increases the removal performance of the cleaning rollers 17 of the leading preliminary cleaning roller pair 25 during removal of the contamination, and therefore improves the cleaning effect.

The cleaning rollers 17 of the following fine cleaning roller pair 26 have a direction of rotation that is counter to the direction of rotation of the cleaning rollers 17 of the leading preliminary cleaning roller pair 25. This results in an operating movement of the fine cleaning rollers whose direction corresponds to the positioning movement of the support strips 2a, 2c, 2e in the forward direction a. In comparison with the speed of the positioning movement of the support strips 2, a particularly high peripheral speed of the cleaning rollers 17 of the fine cleaning roller pair 26 acts in this case counter to a reduction of the resultant operating speed which would otherwise be produced owing to the identical direction of the movements of the support strips 2a, 2c, 2e and the cleaning rollers 17 of the fine cleaning roller pair 26.

If, in the course of the constant movement of the transport pallet 5 in the forward direction a, the support strips 2a, 2c, 2e of the workpiece support 3 are cleaned over the entire length thereof, the service device 9 is lifted vertically above the support strips 2a, 2c, 2e by means of the Z drive and is moved further along the movement axis Y by means of the Y drive with a step dimension d that corresponds to a multiple of a distance between centers of two adjacent support strips 2, where the multiple is an integer that is greater than or equal to one. Thus, the step dimension d can be the distance between centers of two adjacent support strips 2 (if the multiple is one) or can be twice the distance between centers of two adjacent support strips 2 (if the multiple is two). As a result, the service device 9 is positioned above support strips 2b, 2d, 2f, which are intended to be cleaned with the next step. In order to be able to clean the support strips 2b, 2d, 2f, the cleaning rollers 17 are associated with those support strips 2b, 2d, 2f with a lowering movement of the service device 9. During the subsequent cleaning operation, the service device 9 again remains fixed in position with respect to the positioning movement of the transport pallet 5 carried out along the transport axis X in the backward direction b. At the same time, the direction of rotation of all the cleaning rollers 17 is also reversed by the roller drive 21 being switched. The profile of the outer face 19 of the cleaning rollers 17 is constructed in such a manner that it has a cleaning effect irrespective of the direction of rotation of the cleaning rollers 17.

During the positioning movement of the support strips 2b, 2d, 2f carried out in the backward direction b, the second preliminary cleaning roller pair 25 of each cleaning roller set 27 forms the leading preliminary cleaning roller pair 25, which the fine cleaning roller pair 26 of the respective cleaning roller set 27 follows. Subsequently, the cleaning operation during the return travel of the transport pallet 5 takes place in the same way as the functional sequences described above.

By repetition of the described sequence of movement operations, an automated cleaning operation is carried out by the control unit 16 until all the support strips 2 of the workpiece support 3 are cleaned. The mentioned sequence of movement operations is composed of constant forward travel of the transport pallet 5 in the direction of the transport axis X, movement of the service device 9 with a step dimension d in the direction of the movement axis Y, reversal of the direction of rotation of the roller drive 21, constant return travel of the transport pallet 5 in the direction of the transport axis X, repeated movement of the service device 9 with a step dimension d in the direction of the movement axis Y, and reversal of the direction of rotation of the roller drive 21.

Referring to FIG. 3, a second construction type of the mechanical apparatus 1 includes the service device 9 and the movement unit 10 in conjunction with a workpiece support 3. The support strips 2 are arranged, unlike the embodiment described above with respect to FIGS. 1 and 2, at an angle of 90° relative to the transport axis X of the transport pallet 5.

The same reference numerals in FIGS. 1 to 3 refer to the same parts of both embodiments.

FIG. 3 is a top view of the laser cutting machine 4 with the transport carriage 6, which supplies the transport pallet 5 with an unprocessed metal sheet 28, which is located on the workpiece support 3, along the transport axis X from a loading position at the loading and unloading station 7 to an operating region 29 of the laser cutting machine 4. The workpiece support 3 forms a support plane for the unprocessed metal sheet 28, which extends parallel with the plane of the drawing of FIG. 3.

After the processing operation, the processed workpiece is conveyed in the reverse direction out of the operating region 29 into an unloading position at the loading and unloading station 7. While a transport pallet 5 is located in the operating region 29, another transport pallet 5 can be arranged in a loading position or in an unloading position. For positioning, the transport pallets 5 are each transported along a rail guide 30, which is arranged parallel with the transport axis X. The loading position and the unloading position are located along a continuation of the rail guide 30 outside the laser cutting machine 4. A vertically adjustable pallet changing device 31 can be used to move the transport pallet 5 to the loading position, in which the transport pallet 5 is accessible for loading the workpiece support 3 with an unprocessed metal sheet 28, which is intended to be processed, and to the unloading position, in which the transport pallet 5 is provided for unloading a processed metal sheet (not illustrated).

In a sufficiently large intermediate space between a loading opening 32 of the laser cutting machine 4 and the pallet changing device 31, the movement unit 10 constructed similarly to the preceding embodiment is arranged with the service device 9, which is retained and guided in the manner described above. The illustration according to FIG. 3 shows the gantry 11, the guiding head 13, and the extension arm 14 as also shown in FIG. 1 as components of the movement unit 10.

In this case, the support strips 2 of the workpiece support 3 extend parallel with the horizontal movement axis Y of the service device 9. The movement axis Z extends perpendicularly relative to the plane of the drawing of FIG. 3.

The control unit 16, in order to carry out the cleaning operation, affects the coordination of the movement of the transport pallet 5 along the transport axis X with the movements of the service device 9 along the movement axes Y and Z. However, the control operations differ from the preceding embodiment in that the service device 9 is moved constantly back and forth along the movement axis Y, whereas the transport pallet with the workpiece support 3 is first held in position and is subsequently moved further along the transport axis X in a stepwise manner.

The cooperation of the service device 9 with the workpiece support 3 during the cleaning operation is modified with respect to the preceding embodiment in that a continuous movement of the service device 9 with the cleaning rollers 17 is carried out with respect to the support strips 2 fixed in position. The above-described construction, function, and operation of the cleaning rollers 17 and the cooperation thereof with the support strips 2 also apply similarly to the embodiment according to FIG. 3.

The peculiarities during the execution of the cleaning operation with the mechanical apparatus 1 according to FIG. 3 are as follows:

The cleaning rollers 17 of the service device 9 are first associated with the support strips 2a, 2c, 2e of the workpiece support 3 in the manner described above. The transport pallet 5 remains fixed in position. The service device 9 moves in the forward direction a along the horizontal Y axis. As soon as, during this movement, the service device 9 reaches the ends of the support strips 2a, 2c, 2e of the workpiece support 3, the service device 9 is lifted, by means of the Z drive of the extension arm 14, with a vertical positioning movement parallel with the movement axis Z above the support strips 2a, 2c, 2e. The drive of the transport carriage 6 then moves the transport pallet 5 along the transport axis X in the direction towards the laser cutting machine 4 (cf. arrow 33 in FIG. 3). The movement is carried out with a step dimension d, which corresponds to a distance between the centers of support strips 2 that are adjacent to each other. As a result, the service device 9 is positioned above the support strips 2b, 2d, 2f, which are intended to be cleaned in the next step. In order to continue the cleaning operation, the cleaning rollers 17 are associated with the support strips 2b, 2d, 2f with a descending positioning movement of the service device 9 parallel with the movement axis Z. The transport pallet 5 again remains fixed in position. The service device 9 then moves in the backward direction b along the movement axis Y. The direction of rotation of all the cleaning rollers 17 is reversed beforehand by the roller drive 21 being reversed with respect to the direction of rotation during the preceding operating movement of the service device 9 carried out in the forward direction a.

By repetition of the described sequence of functional operations (that is, a constant movement of the service device 9 in the forward direction a, a movement of the transport pallet 5 by the step dimension d, a reversal of direction of rotation of the roller drive 21, a constant movement of the service device 9 in the backward direction b, a repeated movement of the transport pallet 5 by the step dimension d and reversal of direction of rotation of the roller drive 21), the automated cleaning operation is continued until all the support strips 2 of the workpiece support 3 are cleaned.

An optical sensor 34 of the service device 9 is indicated highly schematically in FIG. 3. Before the initiation of a cleaning operation, the support strips 2 of the workpiece support 3 are checked by means of the optical sensor 34 for the presence of deposits that are intended to be removed. The optical sensor 34 is connected to an evaluation unit of the control unit 16. Therefore, a cleaning operation of the above type can be initiated only if a corresponding contamination of the support strips 2 is established by means of the sensor 34.

The cleaning operation described can be carried out synchronously with respect to a processing operation on the laser cutting machine 4.

Other Embodiments

A number of embodiments have been described. Nevertheless, it will be understood that various modifications may be made without departing from the spirit and scope of the invention. Accordingly, other embodiments are within the scope of the following claims.

What is claimed is:

1. A processing machine comprising:
 a sheet metal processing machine for processing metal sheets, the sheet metal processing machine comprising:
  a workpiece support that is formed by a plurality of support strips and forms a support plane for supporting the metal sheets; and
  a support transporter that is coupled to the workpiece support and that is driven along a transport axis X thus conveying the workpiece support along the transport axis X into and out of an operating region of the sheet metal processing machine;
 a workpiece support strip servicing apparatus for servicing the support strips of the workpiece support of the sheet metal processing machine, the workpiece support strip servicing apparatus being located along the transport axis X outside the operating region of the sheet metal processing machine and comprising:
  a service tool transporter that is located along the transport axis X outside the operating region of the sheet metal processing machine, the service tool transporter comprising a service tool to service the support strips; and
  a tool movement unit that is located along the transport axis X outside the operating region of the sheet metal processing machine and that is coupled to and configured to move the service tool transporter along one or more of a movement axis Y arranged at an angle relative to the transport axis X and a movement axis Z arranged at an angle relative to the transport axis X and different from the movement axis Y; and
 a movement controller coupled to both the support transporter of the sheet metal processing machine and to the tool movement unit of the workpiece support strip servicing apparatus, and configured to control both the support transporter of the sheet metal processing machine and the tool movement unit of the workpiece support strip servicing apparatus so as to coordinate the relative movement of the support strips of the workpiece support of the sheet metal processing machine along the transport axis X with respect to the movement of the service tool of the service tool transporter of the workpiece support strip servicing apparatus along one or more of the movement axis Y and the movement axis Z.

2. The processing machine of claim 1, wherein the transport axis X and the movement axis Y are parallel with the support plane of the workpiece support of the sheet metal processing machine and the movement axis Z is perpendicular to the support plane of the workpiece support of the sheet metal processing machine.

3. The processing machine of claim 1, wherein the support strips extend in a direction that is parallel with the transport axis X.

4. The processing machine of claim 1, wherein the support strips extend in a direction that is parallel with the movement axis Y.

5. The processing machine of claim 1, wherein the workpiece support of the sheet metal processing machine comprises support strips that are adjacent to each other and the movement controller is configured to control the support transporter of the sheet metal processing machine and the tool movement unit of the workpiece support strip servicing apparatus in such a manner that the workpiece support of the sheet metal processing machine continuously moves along the transport axis X and the service tool transporter of the workpiece support strip servicing apparatus is positioned along the movement axis Y in a stepwise manner, advancing an incremental distance each step that corresponds to a multiple of a distance between centers of the adjacent support strips, wherein the multiple is an integer number that is greater than or equal to one.

6. The processing machine of claim 1, wherein the workpiece support of the sheet metal processing machine comprises support strips that are adjacent to each other and the movement controller is configured to control the support transporter of the sheet metal processing machine and the tool movement unit of the workpiece support strip servicing apparatus in such a manner that the service tool transporter of the workpiece support strip servicing apparatus continuously moves along the movement axis Y and the workpiece support of the sheet metal processing machine is positioned along the transport axis X in a stepwise manner, advancing an incremental distance each step that corresponds to a multiple of a distance between centers of the adjacent support strips, wherein the multiple is an integer number that is greater than or equal to one.

7. The processing machine of claim 1, wherein the workpiece support strip servicing apparatus further comprises a tool drive configured to produce a tool movement of the service tool.

8. The processing machine of claim 7, wherein the tool movement is directed in a longitudinal direction of the support strips.

9. The processing machine of claim 1, wherein a speed of the service tool differs from a speed of the workpiece support of the sheet metal processing machine and the speed of the service tool differs from a speed of the service tool transporter of the workpiece support strip servicing apparatus.

10. The processing machine of claim 1, wherein the service tool transporter of the workpiece support strip servicing apparatus comprises a plurality of substantially identically constructed service tools that are associated with a support strip or with different support strips.

11. The processing machine of claim 1, wherein the service tool transporter of the workpiece support strip servicing apparatus comprises a plurality of differently constructed service tools that are associated with a support strip or with different support strips.

12. The processing machine of claim 1, wherein the service tool comprises a cleaning roller having an outer face that abuts against a longitudinal side of the associated support strip and rotates about an axis of rotation that is directed parallel with the movement axis Z.

13. The processing machine of claim 12, wherein two identical cleaning rollers form a cleaning roller pair whose cleaning rollers are arranged at the mutually opposing longitudinal sides of a support strip and are driven with opposing directions of rotation.

14. The processing machine of claim 12, wherein the service tool comprises one or more sets of preliminary cleaning roller pairs for the preliminary cleaning of a support strip and two final cleaning rollers that form a final cleaning roller pair for the final cleaning of the support strip.

15. The processing machine of claim 14, wherein the service tool comprises a cleaning roller set comprising two preliminary cleaning roller pairs being adjacent to two opposing sides of the final cleaning roller pair.

16. The processing machine of claim 1, wherein the service tool transporter of the workpiece support strip servicing apparatus comprises an optical sensor having an evaluation unit, wherein the optical sensor is configured to detect and signal an actual state of a support strip contour, and the evaluation unit is configured to generate a control signal for the movement controller in accordance with a desired state of the support strip contour.

17. The processing machine of claim 1, wherein the movement axis Y and the movement axis Z are substantially transverse to one another and also substantially transverse to the transport axis X.

18. A method for processing support strips forming a workpiece support of a sheet metal processing machine, wherein the workpiece support of the sheet metal processing machine forms a support plane for supporting one or more metal sheets and is coupled to a support transporter of the sheet metal processing machine, the method comprising:

moving the support transporter of the sheet metal processing machine along a transport axis X thus moving the workpiece support along the transport axis X, to a workpiece support strip servicing apparatus for servicing the support strips of the workpiece support of the sheet metal processing machine, wherein the workpiece support strip servicing apparatus is located along the transport axis X outside an operating region of the sheet metal processing machine and includes a service tool transporter that is located along the transport axis X outside the operating region of the sheet metal processing machine;

moving the service tool transporter that includes a service tool for servicing the support strips using a tool movement unit that is located along the transport axis X outside the operating region of the sheet metal processing machine, along one or more of a movement axis Y that is arranged at an angle relative to the transport axis X and a movement axis Z that is arranged at an angle relative to the transport axis X and that is different from the movement axis Y; and coordinating the relative movement of the support strips of the workpiece support of the sheet metal processing machine produced by moving the support transporter of the sheet metal processing machine along the transport axis X with respect to the movement of the service tool of the service tool transporter of the workpiece support strip servicing apparatus along one or more of the movement axis Y and the movement axis Z.

19. The method of claim 18, wherein coordinating the relative movement includes continuously moving the support transporter of the sheet metal processing machine with the workpiece support of the sheet metal processing machine along the transport axis X, the workpiece support of the sheet metal processing machine having support strips that are adjacent to each other, and coordinating the relative movement further includes positioning the service tool transporter of the workpiece support strip servicing apparatus along the movement axis Y in a stepwise manner, advancing an incremental distance each step that corresponds to a multiple of a distance between centers of the adjacent support strips, wherein the multiple is an integer number that is greater than or equal to one.

20. The method of claim 18, wherein the workpiece support of the sheet metal processing machine has support strips that are adjacent to each other and wherein coordinating the relative movement includes continuously moving the service tool transporter of the workpiece support strip servicing apparatus along the movement axis Y and positioning the support transporter of the sheet metal processing machine with the workpiece support of the sheet metal processing machine along the transport axis X in a stepwise manner, advancing an incremental distance each step that corresponds to a multiple of a distance between centers of the adjacent support strips, wherein the multiple is an integer number that is greater than or equal to one.

21. The method of claim 18, further comprising moving the service tool along a longitudinal direction of the support strips.

22. The method of claim 18, wherein movement of the service tool includes abutting an outer face of a cleaning roller of the service tool against a longitudinal side of an associated support strip and rotating the cleaning roller about an axis of rotation that is directed parallel with the movement axis Z.

23. The method of claim 18, further comprising:
optically detecting and signaling an actual state of a contour of a support strip, and
generating a control signal for the coordinated relative movement in accordance with a desired state of the support strip contour.

24. The method of claim 18, wherein the movement axis Y and the movement axis Z are substantially transverse to one another and also substantially transverse to the transport axis X.

* * * * *

UNITED STATES PATENT AND TRADEMARK OFFICE
CERTIFICATE OF CORRECTION

| | | |
|---|---|---|
| PATENT NO. | : 8,203,097 B2 | Page 1 of 1 |
| APPLICATION NO. | : 12/356776 | |
| DATED | : June 19, 2012 | |
| INVENTOR(S) | : Wolf Klaiber et al. | |

It is certified that error appears in the above-identified patent and that said Letters Patent is hereby corrected as shown below:

On the title page item 73 (Assignee), line 2, delete "Werkzeugmashinen" and insert
--Werkzeugmaschinen--.

Signed and Sealed this
Nineteenth Day of April, 2016

Michelle K. Lee
*Director of the United States Patent and Trademark Office*